United States Patent
Kosik et al.

(10) Patent No.: US 11,615,789 B2
(45) Date of Patent: Mar. 28, 2023

(54) SYSTEMS AND METHODS TO VERIFY VALUES INPUT VIA OPTICAL CHARACTER RECOGNITION AND SPEECH RECOGNITION

(71) Applicant: Honeywell International Inc., Morris Plains, NJ (US)

(72) Inventors: Michal Kosik, Morris Plains, NJ (US); David Chrapek, Morris Plains, NJ (US); Dominik Kadlcek, Morris Plains, NJ (US)

(73) Assignee: Honeywell International Inc., Charlotte, NC (US)

( * ) Notice: Subject to any disclaimer, the term of this patent is extended or adjusted under 35 U.S.C. 154(b) by 259 days.

(21) Appl. No.: 16/575,827

(22) Filed: Sep. 19, 2019

(65) Prior Publication Data

US 2021/0090559 A1 Mar. 25, 2021

(51) Int. Cl.
*G10L 15/32* (2013.01)
*G10L 15/22* (2006.01)
*G06F 3/01* (2006.01)
*G06F 3/16* (2006.01)
*G06V 10/40* (2022.01)
(Continued)

(52) U.S. Cl.
CPC .............. *G10L 15/22* (2013.01); *G06F 3/017* (2013.01); *G06F 3/167* (2013.01); *G06V 10/40* (2022.01); *G10L 19/022* (2013.01); *G06V 30/10* (2022.01); *G10L 2015/223* (2013.01)

(58) Field of Classification Search
CPC .... G10L 15/26; G10L 15/22–2015/228; G10L 15/00–15/34; G06F 3/017; G06F 3/167; G06K 9/46; G06K 2209/01

USPC ......................................................... 704/235
See application file for complete search history.

(56) References Cited

U.S. PATENT DOCUMENTS

| | | | | |
|---|---|---|---|---|
| 5,799,273 | A | * | 8/1998 | Mitchell ................. G06F 3/167 704/235 |
| 6,151,576 | A | * | 11/2000 | Warnock ................. G10L 15/26 704/235 |
| 6,587,572 | B1 | | 7/2003 | Suchenwirth-Bauersachs et al. |

(Continued)

FOREIGN PATENT DOCUMENTS

EP 2637128 A1 9/2013

*Primary Examiner* — Abul K Azad
(74) *Attorney, Agent, or Firm* — Bookoff McAndrews, PLLC (57) ABSTRACT

Disclosed are systems, methods, and non-transitory computer-readable medium for data input with multi-format validation. The method may include receiving data input via a microphone mounted on a user device and receiving the data input via a camera mounted on the user device. Additionally, the method may include comparing the data input via the microphone and the data input via the camera and determining whether the comparison of the data input exceeds a predetermined confidence level. Additionally, the method may include storing the data input, upon determining that the comparison of the data input exceeds the predetermined confidence level and presenting to the user a notification of validation upon determining that the comparison of the data input does not exceed the predetermined confidence level. Additionally, the method may include receiving from the user a validation of the data input based on the notification of validation and storing the data input based on the validation of the data input.

17 Claims, 6 Drawing Sheets

(51) Int. Cl.
   *G10L 19/022*    (2013.01)
   *G06V 30/10*     (2022.01)

(56) References Cited

U.S. PATENT DOCUMENTS

| | | | |
|---|---|---|---|
| 6,704,709 B1* | 3/2004 | Kahn | G10L 15/26 |
| | | | 704/235 |
| 6,789,231 B1* | 9/2004 | Reynar | G06F 40/274 |
| | | | 704/4 |
| 8,204,737 B2* | 6/2012 | Suominen | G06F 3/167 |
| | | | 704/9 |
| 2007/0011012 A1* | 1/2007 | Yurick | G10L 15/26 |
| | | | 704/277 |
| 2007/0022372 A1* | 1/2007 | Liu | G06V 30/1423 |
| | | | 715/201 |
| 2008/0228496 A1 | 9/2008 | Yu et al. | |
| 2012/0215533 A1* | 8/2012 | Aravamudan | G06F 16/9032 |
| | | | 704/235 |
| 2014/0024411 A1* | 1/2014 | Rao | H04L 69/16 |
| | | | 455/553.1 |

* cited by examiner

SYSTEMS AND METHODS TO VERIFY VALUES INPUT VIA OPTICAL CHARACTER RECOGNITION AND SPEECH RECOGNITION

GOVERNMENT CONTRACT

The project leading to this application has received funding from the Clean Sky 2 Joint Undertaking under the European Union's Horizon 2020 Research and Innovation Programme under grant agreement No 686782.

TECHNICAL FIELD

Various embodiments of the present disclosure generally relate to the field of data entry, including validating data that is input at least in part by human users and, more particularly, to the combined uses of optical character recognition and speech recognition for data validation in the process of data entry.

BACKGROUND

In a number of industries, human workers may have to perform significant amounts of data entry. For example, industries that involve maintenance, repair, and/or overhaul services may involve significant quantities of measurements and serial numbers that are written down or otherwise input into a database or other type of computer or data storage system. Employees may write down such measurements and serial numbers either directly into a computer or even in a logbook or on a piece of paper (e.g., when away from a computer). The process of writing down values of measurements and serial numbers may be error prone and may lead to a variety of problems, such as categorizing an item under the wrong serial number or passing a test because a wrong number was written down. In some cases, employees have recently started also using voice recognition to enter values by speaking. However, voice recognition is not always accurate and may cause the user to have to re-check an correct entered values, which may lead to increased mental load. In other cases, employees have recently started taking pictures of values to perform optical character recognition (OCR) for entering values. However, again, OCR is not always accurate, so employees may have to re-check and correct entered values, which may also lead to increased mental load. The present disclosure is directed to overcoming one or more of these issues.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, non-transitory computer readable media, systems and methods are disclosed for providing automatic data input validation utilizing speech recognition and optical character recognition.

In one embodiment, a computer-implemented method is disclosed for data input with multi-format validation. The method may comprise receiving data input via a microphone mounted on a user device; receiving the data input via a camera mounted on the user device; comparing the data input via the microphone and the data input via the camera; determining whether the comparison of the data input exceeds a predetermined confidence level; storing the data input, upon determining that the comparison of the data input exceeds the predetermined confidence level; presenting to the user a notification of validation upon determining that the comparison of the data input does not exceed the predetermined confidence level; receiving from the user a validation of the data input based on the notification of validation; and storing the data input based on the validation of the data input.

According to another aspect of the disclosure, a computer system for data input with multi-format validation may include a memory having processor-readable instructions stored therein; and at least one processor configured to access the memory and execute the processor-readable instructions, which when executed by the processor configures the processor to perform functions for: receiving data input via a microphone mounted on a user device; receiving the data input via a camera mounted on the user device; comparing the data input via the microphone and the data input via the camera; determining whether the comparison of the data input exceeds a predetermined confidence level; storing the data input, upon determining that the comparison of the data input exceeds the predetermined confidence level; presenting to the user a notification of validation upon determining that the comparison of the data input does not exceed the predetermined confidence level; receiving from the user a validation of the data input based on the notification of validation; and storing the data input based on the validation of the data input.

In another aspect of the disclosure, a non-transitory computer-readable medium containing instructions for data input with multi-format validation. The non-transitory computer-readable medium may comprising receiving data input via a microphone mounted on a user device; receiving the data input via a camera mounted on the user device; comparing the data input via the microphone and the data input via the camera; determining whether the comparison of the data input exceeds a predetermined confidence level; storing the data input, upon determining that the comparison of the data input exceeds the predetermined confidence level; presenting to the user a notification of validation upon determining that the comparison of the data input does not exceed the predetermined confidence level; receiving from the user a validation of the data input based on the notification of validation; and storing the data input based on the validation of the data input.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

As described above, the data entering process may be error prone and mentally tasking. There may be a number of methods for an employee to record data, however, there may be negatives associated with the methods. For example, A user or employee may be writing the data entries on a piece of paper, which may introduce typos when the data is written on the paper and again when the data is read from the paper and entered into a computer. A user or employee may also be recording data by sound, such as speaking to a microphone for speech to text translation. However, there may be instances where the speech engine may not correctly recognize the speech, thus may cause the user to recheck the data and thereby distracting them from other tasks.

Therefore, a need exists for data entry validation that may improve reliably and reduce human errors. In the present disclosure, multiple different inputs may be combined to validate data inputs and reducing the amount of mental effort required by the users to ensure proper data entry. In one or more embodiments, users may be equipped with devices that enables entering of values without a need to have an external input device (i.e. a keyboard) or manual input and at the direct location of data entry. The present disclosure may significantly reduce the costs related to improper data entry based on accidental errors.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1A:
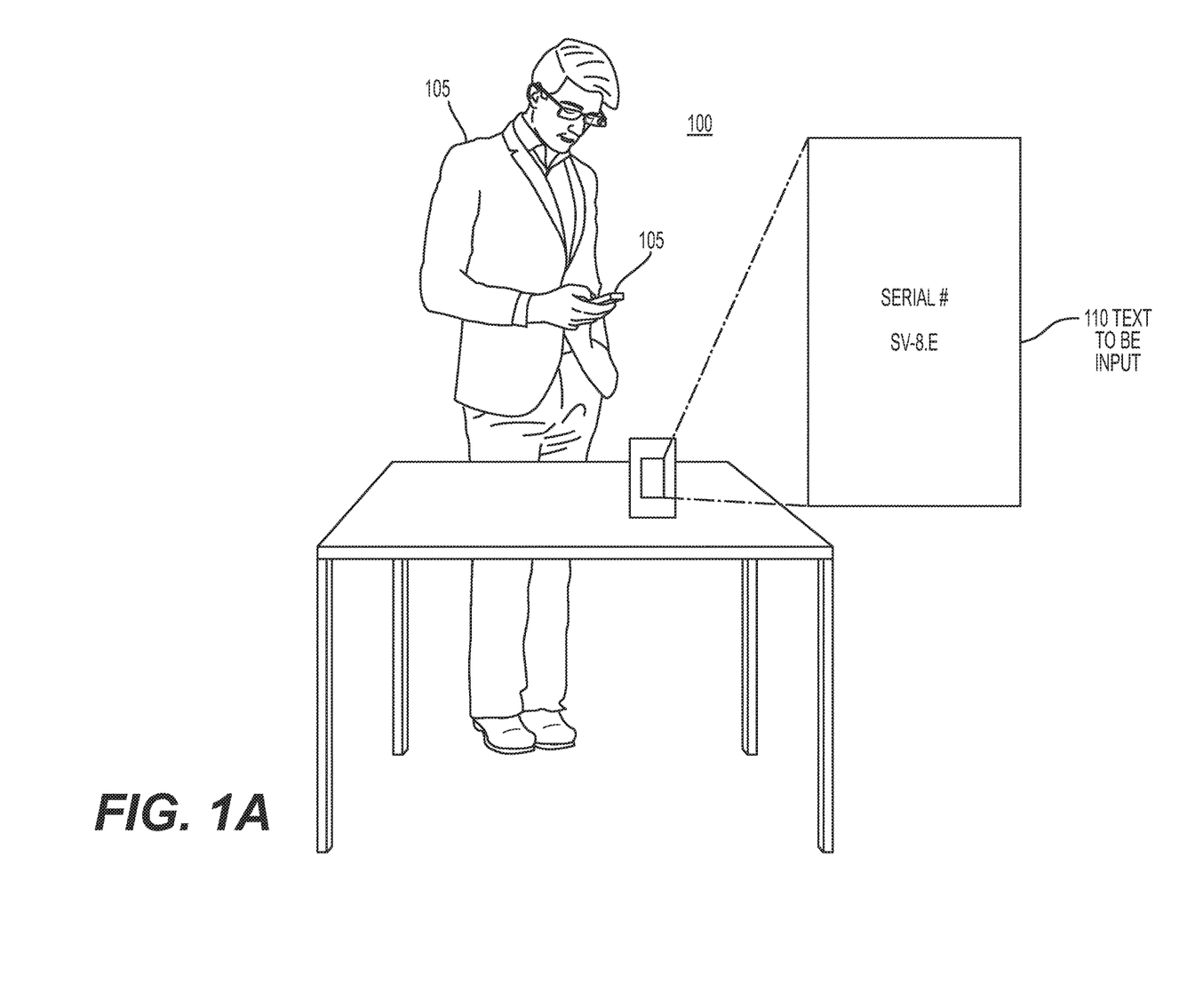
FIGS. 1A and 1B depict an exemplary environment in which systems, methods and other aspects of the present disclosure may be implemented.

Referring now to the appended drawings, FIG. 1A depicts an exemplary environment 100 in which systems, methods and other aspects of the present disclosure may be implemented. Environment 100 may include a user device 105, and text to be input 110. The user device 105 may be operated by a user, and directed by the user to focus on the text to be input 110 so that the text may be in the field of view of the user device 105. The text to be input 110 may be a serial number or any text that may be on an object that may be in the field of view of the user device 105.

Figure 1B:
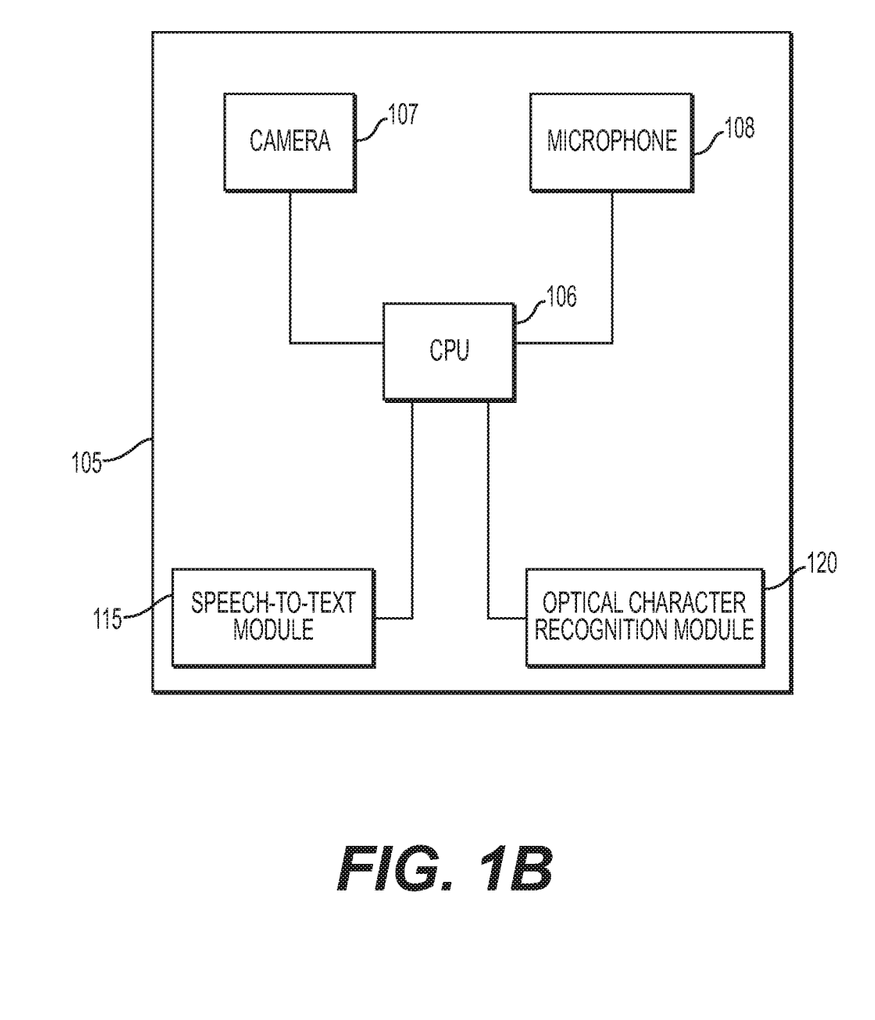

FIG. 1B depicts an exemplary diagram of user device 105, according to aspects of the present disclosure. User device 105 may include a central processing unit (CPU) 106, a camera 107, and a microphone 108. The central processing unit 106 may include a speech-to-text module 115 and an optical character recognition (OCR) module 120. The speech-to-text module 115 may perform a conversion from speech received by the microphone 108 into corresponding text. The OCR module 120 may perform a conversion from an image received by the camera 107 into corresponding text. Any suitable speech recognition engine and OCR logic may be used by CPU 106 to process the data, for example Kaldi speech engine and Tesseract OCR may be used respectively. In one embodiment, the user device 105 may have the CPU 106, camera 107, and microphone 108 constructed together in one device. In another embodiment the CPU 106, camera 107, and microphone 108 may be separate components commutatively connected to each other. In further another embodiment, the CPU 106 may be located remotely from the camera 107 and microphone 108. For example the CPU 106 may be located in a cloud computing system, and the camera 107 and microphone 108 communicate with the CPU 106 via a network. The network may be any suitable network or combination of networks and may support any appropriate protocol suitable for communication of data between various components in the system environment 100. The network may include a public network (e.g., the Internet), a private network (e.g., a network within an organization, or a combination of public and/or private networks.

The user device 105 may be operated by one or more users to perform data input with multi-format validation. Examples of user device 105 may include smartphones, wearable computing devices, smart glasses with augmented reality functions, tablet computers, laptops, and desktop computers.

In the environment 100, a user operating the user device 105 may be present at a location where data entry may be needed. The user would speak the data represented by data entry text 110 into the microphone 108, and the camera 107 would acquire a picture of the data entry text 110. Both the speech captured by the microphone 108 and image acquired by the camera 107 would be sent to CPU 106 for processing to obtain the data represented by data entry text 110. In another embodiment, the CPU 106 may perform optical character recognition (OCR) on a live view of the camera 107 without a picture being taken. Any suitable speech recognition engine and OCR logic may be used by CPU 106 to process the data, for example Kaldi speech engine and Tesseract OCR may be used respectively. The data entry process may start with the user activating the user device 105. The user may activate the user device 105 by pressing a button the user device 105, by performing a hand gesture, by issuing a voice command or any suitable activation method. Once the user device 105 is active, the user may speak the data value into the microphone 108 and the camera 107 may capture an image of the data entry text 110. The microphone 108 and camera 107 may be activated together or separately by the user device 105, the camera 107 may also be activated manually by the user to capture the image. The user device 105 may notify the user when it is active by a number of options. For example, the user device 105 may perform at least one of displaying a notification to the user, flashing a light to the user, playing an auditory sound, or causing the user device 105 to vibrate.

Once the user device 105 has received the data entry, the CPU 106 may perform speech recognition on the voice recording of the user, and an OCR on the data entry text 110. Upon the determination of the data by speech recognition and OCR, the two values are compared and validation is performed. If the data values determined by speech recognition and OCR match beyond a certain predetermined confidence level, the value may be immediately accepted and stored. The predetermined confidence level may be set by the organization of the user, or the predetermined confidence level may be set by the user operating the user device 105. The user device 105 may notified the user of the acceptance by performing a feedback. For example, the user device 105 may perform at least one of displaying a notification to the user (for example, displaying a green status icon), flashing a light to the user, playing an auditory sound, or causing the user device 105 to vibrate.

If the values determined by speech recognition and OCR do no match or is below the predetermine confidence level, the user device 105 may display to the user a notification, the data entry determined by speech recognition and the data entry determined by OCR, and also present to the user at least one of four actions for the user to select to be performed. The user device 105 may allow the user to choose to accept the value recognized by OCR, or accept the value recognized by speech recognizer, or fix mismatched character or data, or perform the complete data entry process again. To select from the presented options, the user may speak the option a loud, or perform a gesture (e.g. raise number of fingers corresponding with the desired option), or pressing the corresponding number on a keypad. If the user selects fix mismatched character or data, the user may perform the speech of the data entry again or enable the camera to perform OCR again. If the user selects to perform the complete data entry process again, the process may start from the beginning and the user may speak the data entry and an OCR of the data entry text 110 may be performed again.

Figure 2:
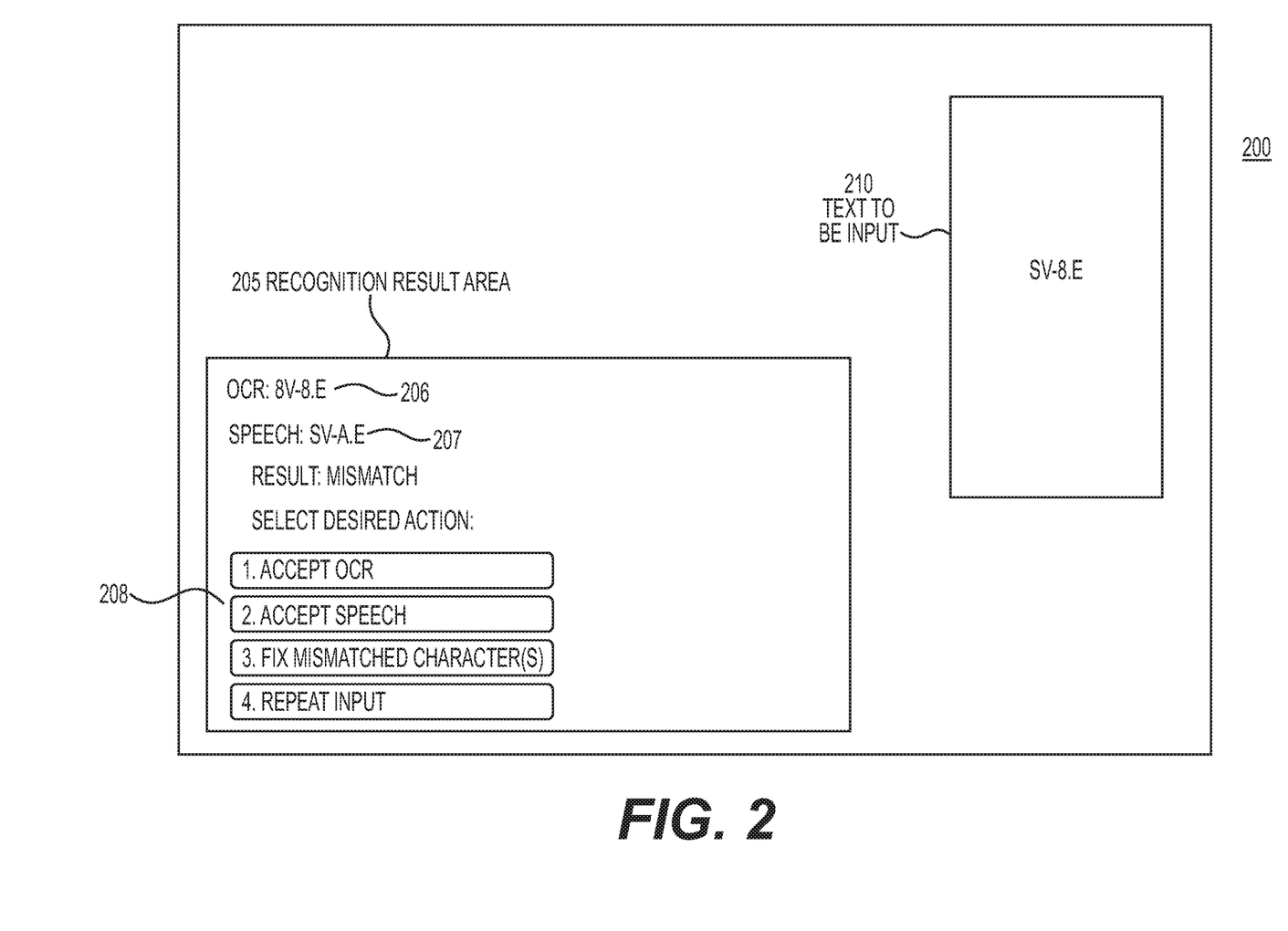
FIG. 2 depicts an exemplary interface for data input with multi-format validation, according to aspects of the present disclosure.
Figure 3:
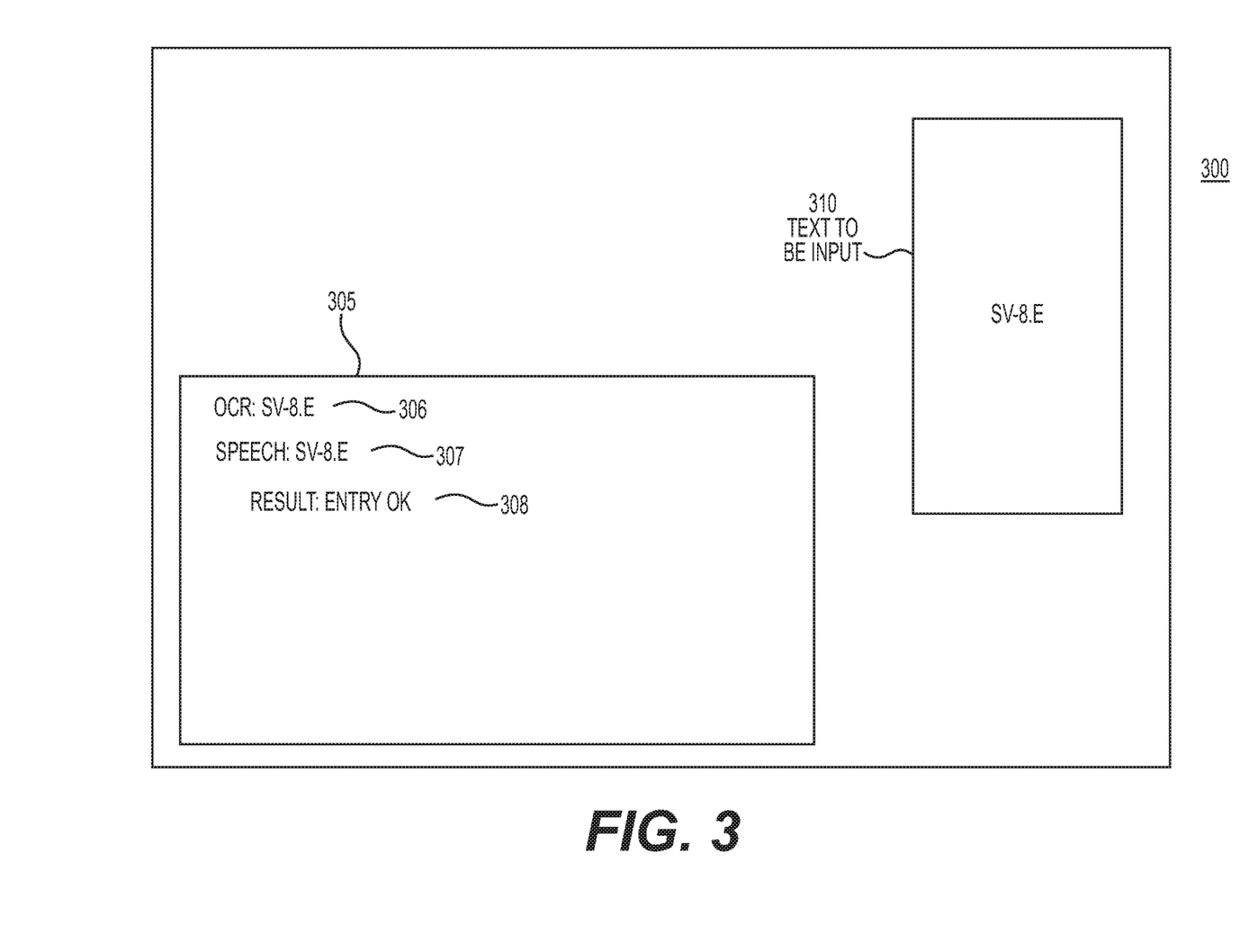
FIG. 3 depicts an exemplary interface for data input confirmation with multi-format validation, according to aspects of the present disclosure.

In one embodiment, the user device 105 may know what type or format of value may be entered and configure the speech and OCR recognition accordingly. For example, the user device 105 may know that the serial number the user wants to enter may be composed from two capital letters, followed by dash, followed by number, decimal point and a capital letter again (as depicted in FIGS. 2 and 3 below). The user device 105 may configure the speech and OCR recognition such that a spoken number "8" will not be recognized as the letter "A" because the user device 105 understands that only a numeric value may be present in the position in the sequence.

As indicated above, FIGS. 1A and 1B are provided merely as an example. Other examples are possible and may differ from what was described with regard to FIG. 1. The number and arrangement of devices and networks shown in FIGS. 1A and 1B are provided as an example. In practice, there may be additional devices, fewer devices and/or networks, different devices and/or networks, or differently arranged devices and/or networks than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) of environment 100 may perform one or more functions described as being performed by another set of devices of environment 100.

FIG. 2 depicts an exemplary interface 200 for data input with multi-format validation, according to aspects of the present disclosure. The exemplary interface 200 may be presented on the user device 105, and may include recognition result area 205 and text to be input 210. The recognition result area 205 may further include OCR result 206, speech recognition result 207, and result options 208. In the exemplary interface 200, the text to be input 210 is "SV-8.E," and the OCR result recognized by the user device 105 may be "8V-8.E" and the speech result recognized by the user device 105 may be "SV-A.E." The user device 105 may display to the user that the results from OCR do not match the results from speech recognition. The user device 105 may highlight the result of the match in a specific color (e.g. red), or may play an auditory sound, or vibrate the user device 105 to notify the user that a mismatch may have occurred.

The user device 105 may also display one of four actions for the user to select to be performed. The user may choose to accept the value recognized by OCR, or accept the value recognized by speech recognizer, or fix mismatched character or data, or perform the complete data entry process again. To select from the presented options, the user may speak the option a loud, or perform a gesture (e.g. raise number of fingers corresponding with the desired option), or pressing the corresponding number on a keypad. If the user selects option 1 to accept OCR, then the data recognized by OCR, "8V-8.E," may be accepted and stored. If the user selects option 2 to accept speech recognition, then the data recognized by speech, "SV-A.E," may be accepted and stored. If the user selects option 3 to fix mismatched character or data, the user may perform the speech of the data entry again or may enable the camera to perform OCR again. For example, the user may adjust lighting or viewing angle to facilitate a improved OCR capture.

In the exemplary interface 200, both the OCR and speech recognition have obtained the incorrect value, therefore the user may select option 4 to perform the complete data entry process again, the process may start from the beginning and the user may speak the data entry and an OCR of the data entry text 210 may be performed again.

The interfaces shown in FIG. 2 are provided as an example. In practice, there may be additional interface information, fewer interface information, different interface information, or differently arranged interface information than those shown in FIG. 2.

FIG. 3 depicts an exemplary interface 300 for data input confirmation with multi-format validation, according to aspects of the present disclosure. The exemplary interface 300 may be presented on the user device 105, and may include recognition result area 305 and text to be input 310. The recognition result area 305 may further include OCR result 306, speech recognition result 307, and result options 308. In the exemplary interface 300, the text to be input 310 is "SV-8.E," and the OCR result recognized by the user device 105 may be "SV-8.E" and the speech result recognized by the user device 105 may be "SV-8.E." The user device 105 may display to the user that the results from OCR matches the results from speech recognition. The user device 105 may highlight the result of the match in a specific color (e.g. green), or may play an auditory sound, or vibrate the user device 105 to notify the user that a match may have occurred and the recognized value will be stored.

The interfaces shown in FIG. 3 are provided as an example. In practice, there may be additional interface information, fewer interface information, different interface information, or differently arranged interface information than those shown in FIG. 3.

Figure 4:
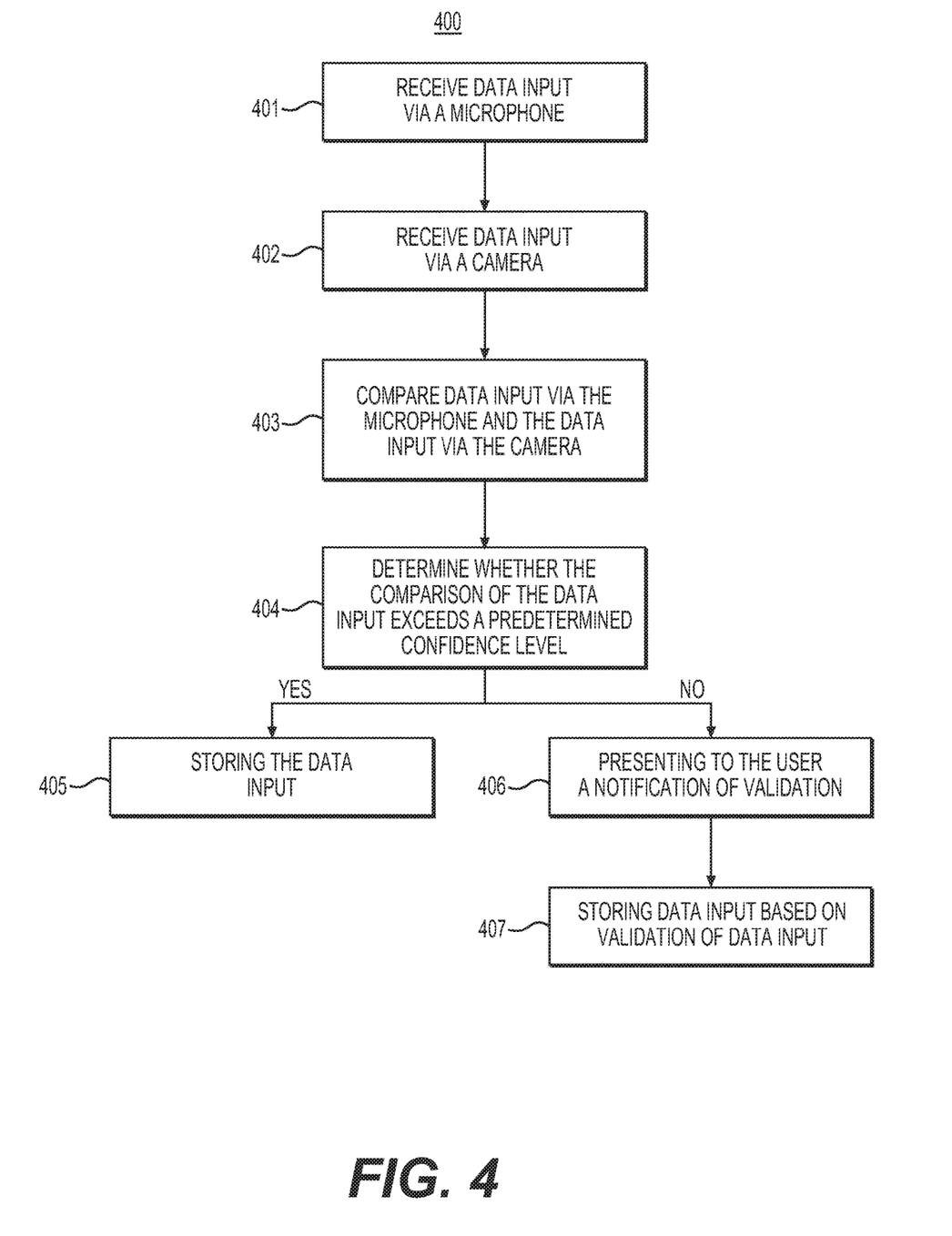
FIG. 4 depicts an exemplary flow diagram of data input with multi-format validation, according to aspects of the present disclosure.

FIG. 4 depicts an exemplary flow diagram 400 of data input with multi- format validation, according to aspects of the present disclosure. Diagram 400 may begin at step 401 where the user device 105 may have been activated by the user and data is received via the microphone of the user device 105. At step 402, data input from the camera is received. Data input may be captured using OCR on an image taken by the camera, or on the live view of the camera without taking a picture. Upon receiving the data input from the microphone and the camera, a comparison may be performed at step 403 on the data received from the microphone and the data received from the camera. At step 404, a determination may be obtained based on the comparison of the data received from the microphone and the data received from the camera on whether the data match exceeds a predetermined confidence level. Upon the determination that the data match exceeds a predetermined confidence level, the data is entered and stored at step 405. Upon the determination that the data match does not exceed a predetermined confidence level, a notification of validation is presented to the user at step 406. The user may perform at least one option of data validation at step 407, and the data entered and stored based on the validation of data input.

Although FIG. 4 shows example blocks, in some implementations, diagram 400 may include additional blocks, fewer blocks, different blocks, or differently arranged blocks than those depicted in FIG. 4. Additionally, or alternatively, two or more of the blocks of process 400 may be performed in parallel.

Figure 5:
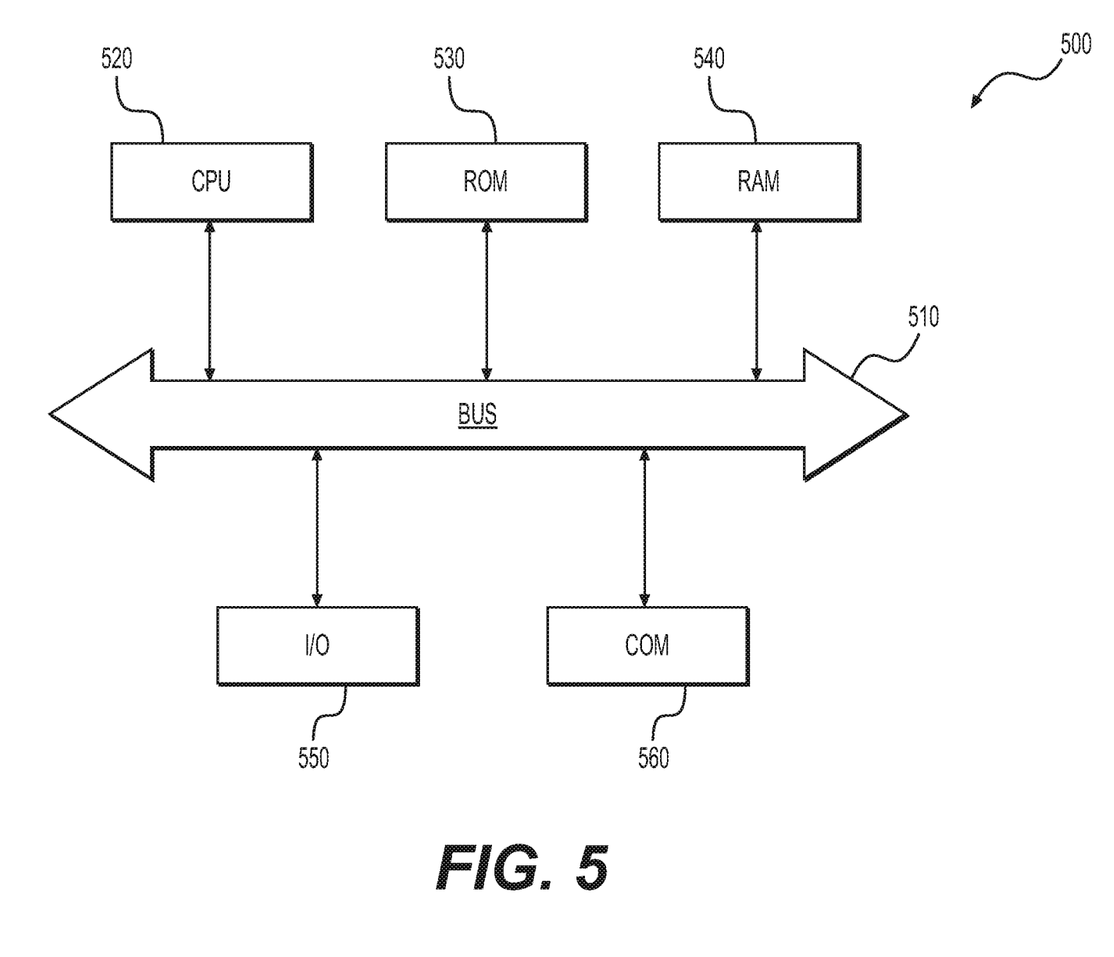
FIG. 5 depicts an exemplary computer device or system, in which embodiments of the present disclosure, or portions thereof, may be implemented

FIG. 5 depicts a high-level functional block diagram of an exemplary computer device or system, in which embodiments of the present disclosure, or portions thereof, may be implemented, e.g., as computer-readable code. In some implementations, the user device 105 may correspond to device 500. Additionally, each of the exemplary computer servers, databases, user interfaces, modules, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4, may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A wearable device with augmented reality capability, wherein the wearable device comprises:
   a microphone configured to receive audio data indicative of a text;
   a camera configured to view an image of the text;
   a memory; and
   a processor communicatively coupled to the memory, wherein the processor is configured to:
   perform speech recognition on the audio data received via the microphone to obtain first data;
   perform optical character recognition (OCR) on a live view of the camera to obtain second data;
   compare the first data and the second data;
   determine if the comparison of the first data indicative of the audio data and the second data indicative of OCR data received from the camera exceeds a predetermined confidence level;
   present to a user at least one notification in response to the determination that the comparison of the first data and the second data does not exceed the predetermined confidence level, wherein the at least one notification indicates at least one option to correct at least one mismatched character, wherein the at least one option comprises at least one of: accepting a first value recognized by OCR, accepting a second value recognized by speech recognizer, fixing mismatched character or data, or re-performing data entry;
   identify a gesture performed by the user to select the at least one option to correct the at least one mismatched character;
   updating at least one of the first data and the second data with at least one corrected character.

2. The wearable device of claim 1, wherein the wearable device knows what type or format of value may be entered and configures the speech and OCR recognition accordingly.

3. The wearable device of claim 1, wherein determining whether the comparison of the first data indicative of the audio data and the second data indicative of the OCR data received from the camera exceeds the predetermined confidence level includes determining whether a match between the first data and the second data exceeds the predetermined confidence level, and wherein the predetermined confidence level is adjustable.

4. The wearable device of claim 1, wherein the wearable device is further configured to provide feedback to the user operating the wearable device for data input, wherein the feedback includes at least one of displaying a notification, flashing a light, playing an auditory sound, or causing the wearable device to vibrate.

5. The wearable device of claim 1, further comprising activating the wearable device prior to receiving data, wherein the activating the wearable device is performed by at least one of voice command, gesture, or button interaction.

6. The wearable device of claim 1, further comprising displaying a visual indicator on a display of the wearable device, wherein the visual indicator indicates that the at least one of the first data and the second data is stored as validated data in the wearable device in response determining that the comparison of the first data and the second data exceeds the predetermined confidence level.

7. A computer system comprising:
   a memory having processor-readable instructions stored therein; and
   at least one processor configured to access the memory and execute the processor-readable instructions, which when executed by the at least one processor configures the at least one processor to perform functions for:
   receiving, via a microphone mounted on a wearable device with augmented reality capability, audio data indicative of a text;
   performing speech recognition on the audio data received via the microphone to obtain first data;
   performing optical character recognition (OCR) on a live view of a camera to obtain second data;
   comparing the first data and the second data;
   determining if the comparison of the first data indicative of the audio data and the second data indicative of the OCR data received from the camera exceeds a predetermined confidence level;
   presenting to a user at least one notification in response to determining that the comparison of the first data and the second data does not exceed the predetermined confidence level, wherein the at least one notification indicates at least one option to correct at least one mismatched character, wherein the at least one option comprises at least one of: accepting a first value recognized by OCR, accepting a second value recognized by speech recognizer, fixing mismatched character or data, or re-performing data entry;
   identifying a gesture performed by the user to select the at least one option to correct the at least one mismatched character; and
   updating at least one of the first data and the second data with at least one corrected character.

8. The computer system of claim 7, further comprising performing OCR on an image to obtain the second data indicative of the text,
   wherein the wearable device knows what type or format of value may be entered and configures the speech and OCR recognition accordingly.

9. The computer system of claim 7, wherein determining whether the comparison of the first data indicative of the audio data and the second data indicative of the OCR data received from the camera exceeds the predetermined confidence level includes determining whether a match between the first data and the second data exceeds the predetermined confidence level, and wherein the predetermined confidence level is adjustable.

10. The computer system of claim 7, further comprising providing feedback to the user operating the wearable device for data input, wherein the feedback includes at least one of displaying a notification, flashing a light, playing an auditory sound, or causing the wearable device to vibrate.

11. The computer system of claim 7, further comprising activating the wearable device prior to receiving data, wherein the activating the wearable device is performed by at least one of voice command, gesture, or button interaction.

12. The computer system of claim 7, further comprising displaying a visual indicator on a display of the wearable device, wherein the visual indicator indicates that the at least one of the first data and the second data is stored as validated data in the wearable device in response determining that the comparison of the first data and the second data exceeds the predetermined confidence level.

13. A non-transitory computer-readable medium containing instructions for data input with multi-format validation, comprising:
   receiving, via a microphone mounted on a wearable device, audio data indicative of a text;
   performing, by a processor of the wearable device, speech recognition on the audio data received via the microphone to obtain first data;
   performing, by the processor of the wearable device, optical character recognition (OCR) on a live view of a camera;
   comparing the first data and the second data;
   determining if the comparison of the first data indicative of the audio data and the second data indicative of the OCR data received from the camera exceeds a predetermined confidence level;
   presenting to a user at least one notification in response to determining that the comparison of the first data and the second data does not exceed the predetermined confidence level, wherein the at least one notification indicates at least one option to correct at least one mismatched character, wherein the at least one option comprises at least one of: accepting a first value recognized by OCR, accepting a second value recognized by speech recognizer, fixing mismatched character or data, or re-performing data entry;
   identifying a gesture performed by the user to select the at least one option to correct the at least one mismatched character; and
   updating at least one of the first data and the second data with at least one corrected character.

14. The non-transitory computer-readable medium of claim 13, further comprising performing OCR on an image to obtain the second data indicative of the text,
   wherein the wearable device knows what type or format of value may be entered and configures the speech and OCR recognition accordingly.

15. The non-transitory computer-readable medium of claim 13, further comprising providing feedback to the user operating the wearable device for data input, wherein the feedback includes at least one of displaying a notification, flashing a light, playing an auditory sound, or causing the wearable device to vibrate.

16. The non-transitory computer-readable medium of claim 13, further comprising activating the wearable device prior to receiving data, wherein the activating the wearable device is performed by at least one of voice command, gesture, or button interaction.

17. The non-transitory computer-readable medium of claim 13, further comprising displaying a visual indicator on a display of the wearable device, wherein the visual indicator indicates that the at least one of the first data and the second data is stored as validated data in the wearable device in response determining that the comparison of the first data and the second data exceeds the predetermined confidence level.

\* \* \* \* \*